United States Patent [19]

Tute

[11] Patent Number: 4,569,138
[45] Date of Patent: Feb. 11, 1986

[54] ERROR CORRECTION SYSTEM FOR LENGTH OR ANGLE MEASURING INSTRUMENT

[75] Inventor: Rainer Tute, Traunwalchen, Fed. Rep. of Germany

[73] Assignee: Dr. Johannes Heidenhain GmbH, Traunreut, Fed. Rep. of Germany

[21] Appl. No.: 689,713

[22] Filed: Jan. 8, 1985

[30] Foreign Application Priority Data

Jan. 14, 1984 [DE] Fed. Rep. of Germany ....... 3401141

[51] Int. Cl.$^4$ ............................................. G01B 11/04
[52] U.S. Cl. ................................................. 33/125 R
[58] Field of Search ............ 33/125 R, 125 C, 125 A, 33/125 T, DIG. 19, 147 D

[56] References Cited

U.S. PATENT DOCUMENTS 4,060,903 12/1977 Ernst .
4,170,829 10/1979 Nelle .
4,517,742 5/1985 Ernst ................................. 33/125 C

FOREIGN PATENT DOCUMENTS 2518745 8/1977 Fed. Rep. of Germany .
2735154 8/1977 Fed. Rep. of Germany .
1964381 10/1978 Fed. Rep. of Germany .
3224005 1/1984 Fed. Rep. of Germany .

*Primary Examiner*—Harry N. Haroian
*Attorney, Agent, or Firm*—Willian Brinks Olds Hofer Gilson & Lione Ltd.

[57] ABSTRACT

A length or angle measuring instrument includes a measuring scale which is perforated. The perforations are engaged by gear wheels which operate to stretch or compress the scale in order to compensate for measuring errors of the measuring graduation as well as for errors in the guides of the object to be measured. This system can be used to compensate both linear and non-linear errors.

14 Claims, 6 Drawing Figures

ERROR CORRECTION SYSTEM FOR LENGTH OR ANGLE MEASURING INSTRUMENT

BACKGROUND OF THE INVENTION

The present invention relates to an error compensation arrangement for a length or angle measuring instrument, of the type which includes a base and a measuring scale positioned on the base.

West German DE-OS No. 32 24 005 discloses a measuring scale which defines recesses in which elements are engaged in order to apply varied longitudinal tensions to the measuring scale. This measuring scale is a closed system in itself, because the tension-producing elements are mounted directly to the scale. After the measuring scale has been corrected outside of the measuring system, it can then be installed in the measuring system in a balanced, corrected state.

In addition, a number of error compensating arrangements of past measuring systems have been devised in which the adjusting devices for the compensation of errors are mounted to react against a base. These adjusting devices operate to vary the effective length of the measuring scale.

For example, German patent DE-PS No. 25 18 745 includes adjusting devices for applying tensile or compressive forces to the face sides of the measuring scale in order to stretch or compress this measuring scale uniformly along its entire length. In this way, linear errors are compensated. The measuring scale in this patent is relatively rigid and resistant to bending.

German DE-AS No. 27 35 154 discloses an arrangement for compensating non-linear errors by deflecting a measuring scale perpendicularly to the plane of the graduation. The bending of the measuring graduation leads to effective elongations or compressions at the region of deflection, since the edge zones of the measuring scale at the surface at which the measuring graduation is located are altered in effective length.

Each of these arrangements has its own disadvantages. Thus, the system disclosed in DE-PS No. 25 18 745 can only be used to compensate for linear errors. The system disclosed in DE-AS No. 27 35 154 results in a measuring scale which is relatively difficult to scan, since the scale has been deflected perpendicularly to the graduation plane and the scanning distance is therefore variable.

This last mentioned disadvantage can be avoided according to FIG. 4 of DE-AS No. 27 35 154 by directly guiding the scanning unit on the scale. However, this approach requires a relatively expensive coupling of the scanning unit to the object to be measured, since the scanning unit is not guided on a flat surface.

SUMMARY OF THE INVENTION

The present invention is directed to an error correction system for a measuring instrument, which can be used to balance not only constant linear errors over the entire measuring length, but which also permits partial error compensation for non-linear errors. It is also an object of this invention to provide such error compensation in a manner which can be implemented simply and which places no unusual demands on the coupling arrangement for the scanning unit.

According to this invention, a length or angle measuring instrument of the type described initially above is provided with a measuring scale which defines a plurality of recesses. A plurality of adjusting devices are mounted to the base, each shaped to engage the recesses. These adjusting devices are moveable with respect to the base in order to vary the magnitude of forces applied to the scale and thereby to adjust the effective length of at least a portion of the scale.

The present invention provides important advantages in that the recesses in the measuring scale can be provided before the measuring graduation is applied to the scale. For example, mechanical or chemical processes can be used to form the recesses. Thereafter, the scale can be thermally treated and then the measuring graduation can be applied to the scale. If need be, it may be possible in many applications to utilize a steel band which includes the desired recesses and can be kept in stock as a standard carrier body.

The invention itself, together with further objects and attendant advantages, will best be understood by reference to the following detailed description, taken in conjunction with the accompanying drawings.

BRIEF DESCRIPTION OF THE HEADING

FIG. 5 (a) is an enlarged detailed view of a portion of the embodiment of FIG. 5.

DETAILED DESCRIPTION OF THE PRESENTLY PREFERRED EMBODIMENTS

Figure 1:
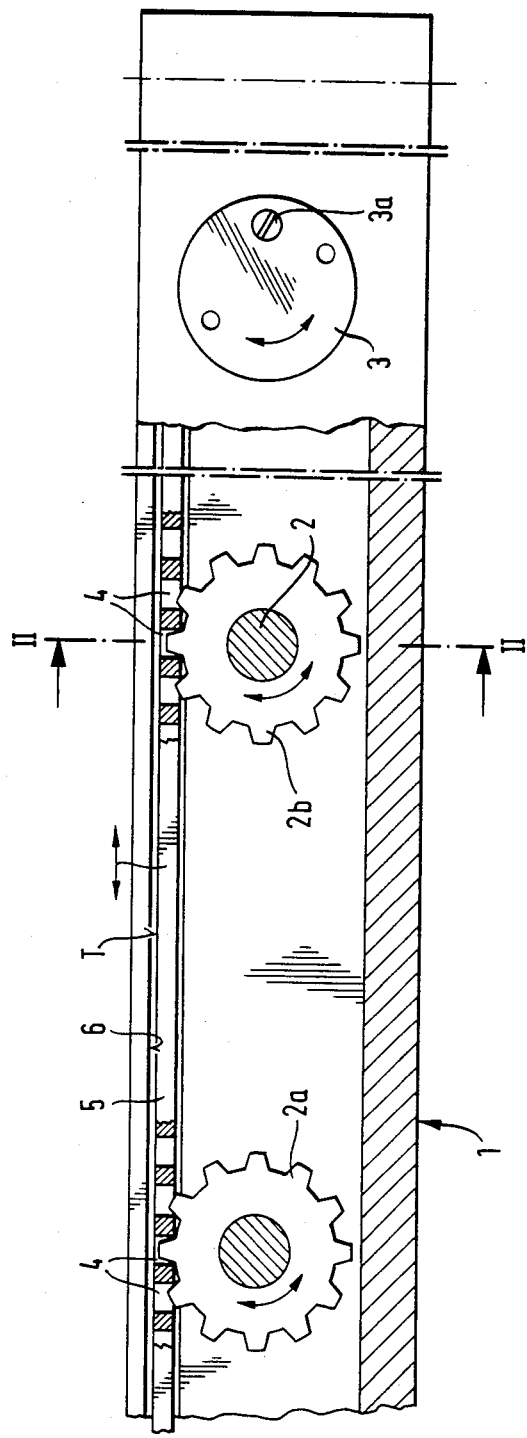
FIG. 1 is a partially sectioned view of a length measuring instrument which incorporates a first preferred embodiment of this invention.

Turning now to the drawings, FIG. 1 shows a length measuring instrument which includes a base 1. A plurality of gear wheels 2a, 2b are rotatably mounted to the base 1. As explained below, the gear wheels 2a, 2b serve as adjusting devices and are operated by means of respective adjusting discs. Each of the gear wheels 2a, 2b is coupled to a respective adjusting disc. The teeth of the gear wheels 2a, 2b are shaped and positioned to engage recesses that are formed in the measuring graduation carrier 5 alongside the measuring graduation. The measuring graduation carrier 5 is mounted to be slightly shiftable longitudinally in a groove 6 defined by the base 1. Typically, the measuring graduation carrier 5 is fixedly secured at one end to the base 1. This can be accomplished by screwing, cementing, spot welding or using other similar techniques to secure the carrier 5 to the base 1. Typically, the other end of the measuring graduation carrier 5 is fastened in a known manner by means of a clamping or tensioning device to the base 1.

By twisting individual ones of the adjusting discs 3, corresponding regions of the measuring graduation carrier 5 can be partially stretched or compressed by means of the engaged teeth of the gear wheels 2a, 2b.

By synchronous rotation of the various adjusting discs 3, the graduation carrier 5 can be stretched or compressed uniformly over its entire length in order to compensate for linear errors.

It is also possible to combine total compensation for linear errors with partial compensation for non-linear errors. This can be done by applying an additional partial stretching or compression by individual adjusting devices 2a, 2b in addition to a linear stretching or compression of the carrier 5.

After the gear wheels 2a, 2b have been properly adjusted in order to obtain the desired error compensation, the gear wheels 2a, 2b can be then fixed in position. In this embodiment this is accomplished by means of clamping screws 3a which are threadedly connected to the adjusting discs 3.

Figure 2:
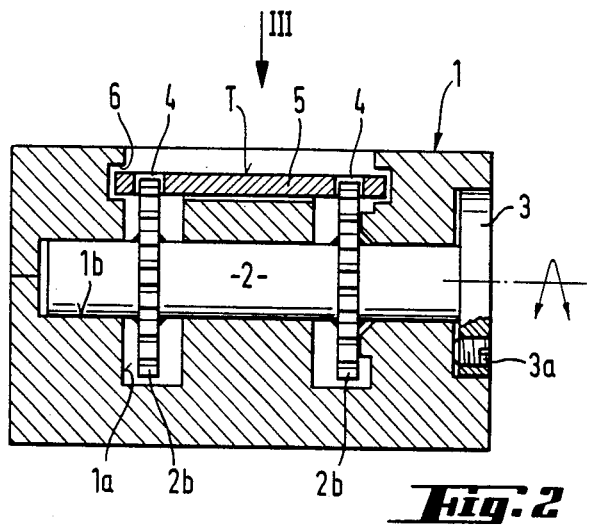
FIG. 2 is a cross sectional view taken along line II—II of FIG. 1.

FIG. 2 shows a cross sectional view through the embodiment of FIG. 1 taken along line II—II of FIG. 1. As shown in FIG. 2, the base 1 defines two spaced parallel slits 1a as well as a number of spaced parallel bores 1b. The gear wheels 2a, 2b are mounted on shafts 2 which are rotatably mounted in the bores 1b. The adjusting discs 3 are rigidly secured to the shafts 2 to allow rotation of the gear wheels 2a, 2b.

In addition, the base 1 defines a groove 6 which extends along a longitudinal direction. The measuring graduation carrier 5 is placed in this groove 6 and fastened in a known manner at the ends of the base 1. No detailed representation has been provided of the manner in which the ends of the carrier 5 are attached to the base 1, since the particular type of end fastening for the carrier 5 does not form part of this invention.

The laterally outer regions of the measuring graduation carrier 5 define respective regular arrays of recesses 4, which in this embodiment are periodically continued over the entire measuring length. The recesses 4 of this embodiment resemble the recesses which are used as perforations for 35 mm photographic film.

Figure 3:
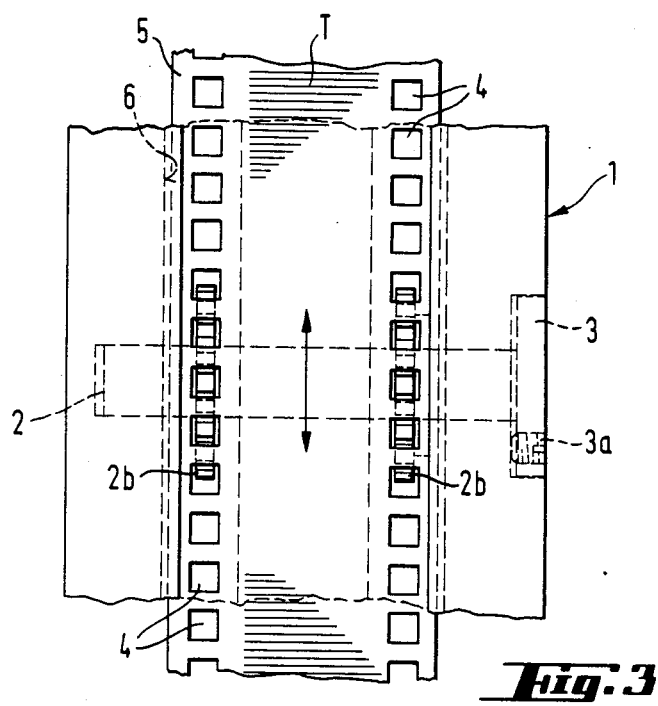
FIG. 3 is a plan view of a portion of the length measuring instrument of FIG. 1.

FIG. 3 provides a plan view which further clarifies the structure shown in FIGS. 1 and 2.

If the measuring graduation T includes errors along its length, or if the objects moveable relative to one another are guided with guidance errors, these errors can be compensated by adjusting the effective length of the measuring graduation T as necessary by means of the gear wheels 2a, 2b.

In order to perform this adjustment, the adjusting disc 3 of a selected one of the gear wheels 2a, 2b is positioned in accordance with the desired error correction course. As the adjusting disc 3 is rotated, the teeth of the gear wheel 2a, 2b engage the recesses 4 and apply either stretching or compressing forces to the measuring graduation carrier 5. In this way, the spacing between the graduation lines of the graduation T is altered in order to compensate for errors.

As mentioned above in connection with FIG. 1, this error compensation process can be carried out locally in specific regions of the carrier 5 or alternately over relatively large ranges of length of the carrier 5.

Figure 4:
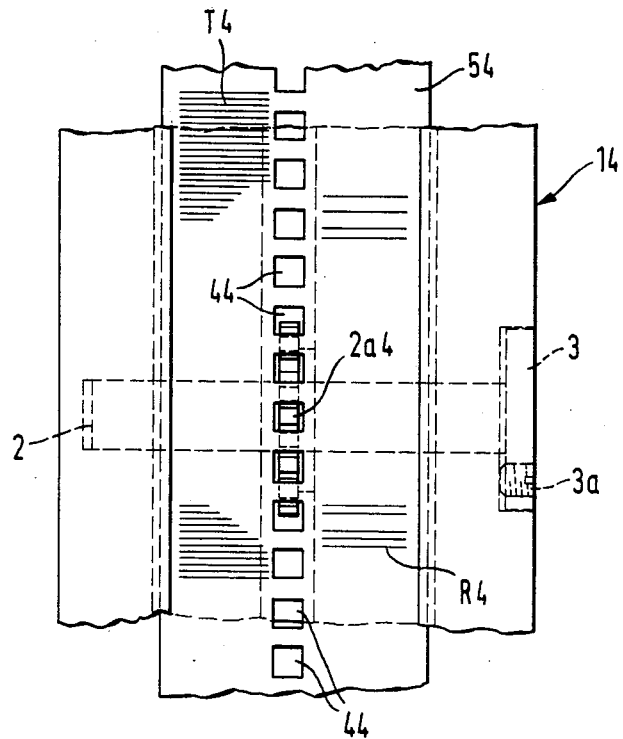
FIG. 4 is a plan view corresponding to FIG. 3 of a second preferred embodiment of this invention.

A second preferred embodiment of this invention is illustrated in FIG. 4. In FIG. 4, the measuring graduation carrier 54 defines a single array of recesses 44 arranged at about the center of the carrier 54. The measuring graduation T4 is provided on one side of the recesses 44, and a reference mark track R4 is provided on the other side of the recesses 44. The formation and purpose of the reference marks R4 is explained in detail in the relevant patent literature, for example in German patent DE-PS No. 19 64 381.

The adjusting devices 2a4 of FIG. 4 operate in a manner which is analogous to that described above in conjunction with the first preferred embodiment.

Figure 5:
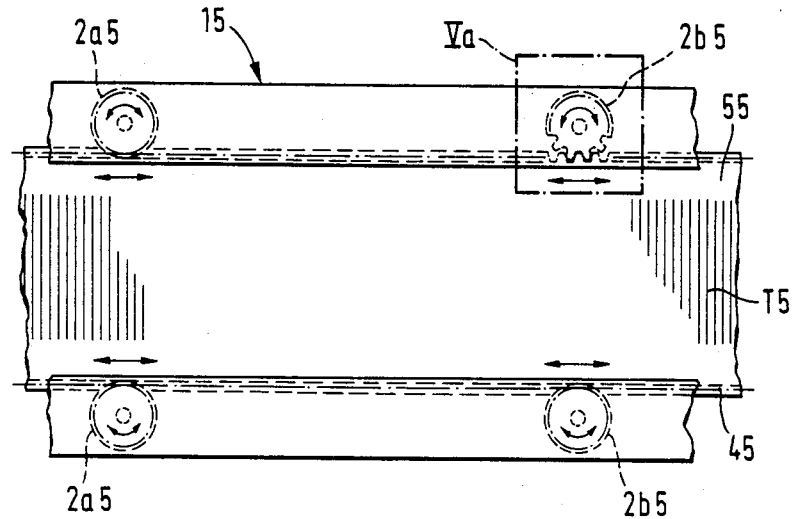
FIG. 5 is a plan view of a third preferred embodiment of this invention which includes a compensating arrangement and lateral recesses formed in the measuring scale.
Figure 5A:
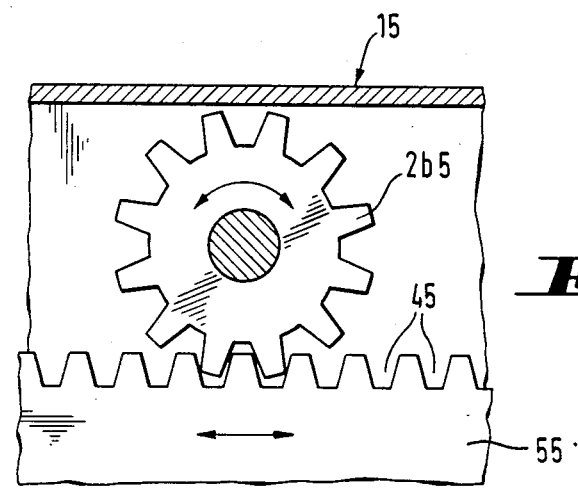

FIGS. 5 and 5a show partial views of a third preferred embodiment of this invention in which a measuring graduation carrier 55 is provided with recesses 45 that are applied directly to the longitudinal edges of the carrier 55. These recesses 45 in effect form a gear rack, as is evident in the detailed view of FIG. 5a.

In this third preferred embodiment, a plurality of pinion gear wheels 2a5, 2b5 are mounted in the plane of the measuring graduation carrier 55 to engage the recesses 45. Rotation of the pinion gear wheels 2a5, 2b5 allows error compensation to be accomplished in the manner described above.

Of course, in this third preferred embodiment steps should be taken to prevent the adjusting arrangement from automatically resetting or drifting. Set screws such as those described above can be used to lock in the error compensation as desired. In addition to set screws such as the set screws 3a described above in FIG. 1, locking latches or the like can also be used.

In the event the measuring graduation carrier, the base and/or the objects to be measured have differing coefficients of thermal expansion, or in the event a housing formed of a different material is provided, it is often advantageous to decouple the fastening arrangements for the measuring graduation carrier from the base or the housing. This can be done for example by means of elastic bearings.

If the measuring graduation carrier is constructed as a flexible band tensioned over a drum, then an angle measuring arrangement can be provided in which the compensation systems described above can readily be adapted for use in an analogous manner. Furthermore, temperature fluctuations can lead to errors of the measuring graduation and these errors can be compensated for by use of the compensation arrangements described above. Such temperature compensation can be made automatically by means of a directly interposed gear.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a length or angle measuring instrument for determining the relative position of two objects movable relatively to one another, of the type comprising a base and a measuring scale positioned on the base, the improvement comprising:
   a plurality of recesses formed in the measuring scale; and
   a plurality of adjusting devices mounted to the base and shaped to engage the recesses, said adjusting devices being movable with respect to the base to vary the magnitude of forces applied to the scale substantially in a measuring direction defined by the scale in order to adjust the effective length of a least a portion of the scale.

2. The invention of claim 1 wherein the recesses define a regular array of perforations in the scale, and wherein each of the adjusting devices comprises a respective gear comprising a plurality of teeth shaped to engage the perforations.

3. The invention of claim 1 wherein the scale defines a pair of longitudinal edges, wherein the recesses define an array of teeth, and wherein the adjusting devices comprise respective gears positioned to mesh with the array of teeth.

4. The invention of claim 1 further comprising:
a plurality of adjusting discs, each coupled to operate a respective one of the adjusting devices; and
means for fixing the adjusting discs in place.

5. The invention of claim 1 wherein the scale comprises a flexible steel band.

6. The inventions of claim 2 wherein the scale comprises a flexible steel band.

7. The invention of claim 6 wherein the perforations are mechanically stamped in the scale.

8. The invention of claim 6 wherein the perforations are chemically etched in the scale.

9. The invention of claim 1 wherein the scale is resistant to bending.

10. The invention of claim 3 wherein the scale is resistant to bending.

11. The invention of claim 10 wherein the teeth are milled in the scale.

12. The invention of claim 10 wherein the teeth are formed in the scale by grinding.

13. The invention of claim 1 wherein the adjusting devices are coupled by a gear with at least one of the objects to be measured to automatically compensate for temperature caused error.

14. In a length or angle measuring instrument for determining the relative position of two objects movable relatively to one another, of the type comprising a base and a measuring scale positioned on the base so as to be shiftable with respect to the base, the measuring scale comprising a graduation of spaced marks and the graduation defining a measuring direction, the improvement comprising:
a plurality of recesses formed in the measuring scale;
a plurality of gears rotatably mounted to the base, each gear comprising a plurality of teeth shaped to engage the recesses; and
a plurality of adjusting discs, each in mechanical communication with a respective one of the gears and positioned exterior to the base, each adjusting disc comprising a locking means operative to prevent rotation of the respective gear;
the adjusting discs, gears and recesses operative to apply a force of variable magnitude to the scale in a direction substantially parallel to the measuring direction of the scale to produce compression or expansion in the measuring direction of at least a portion of the scale to compensate for linear and non-linear spacing errors of the graduation.

* * * * *